(12) United States Patent
Goetzinger et al.

(10) Patent No.: US 6,550,257 B1
(45) Date of Patent: Apr. 22, 2003

(54) ANGLED UV FIXTURE IN A-COIL

(75) Inventors: Gregory T. Goetzinger, Grenada, MS (US); Robert E. Smith, Lawrenceville, GA (US); Gregg Burnett, Rockwall, TX (US)

(73) Assignees: Heatcraft Inc., Grenada, MS (US); Dust Free, Inc., Royse City, TX (US)

( * ) Notice: Subject to any disclaimer, the term of this patent is extended or adjusted under 35 U.S.C. 154(b) by 0 days.

(21) Appl. No.: 10/026,343

(22) Filed: Dec. 21, 2001

(51) Int. Cl.⁷ ............................... F25D 21/14; F24F 3/16
(52) U.S. Cl. ............................................. 62/78; 62/291
(58) Field of Search .......................... 62/264, 515, 295, 62/297, 78; 165/122

(56) References Cited

U.S. PATENT DOCUMENTS

| | | | | |
|---|---|---|---|---|
| 3,831,670 A | * | 8/1974 | Mullings | 62/515 |
| 3,905,789 A | * | 9/1975 | Carpenter | 62/515 |
| 4,912,940 A | * | 4/1990 | Anderson et al. | 62/515 |
| 4,990,313 A | * | 2/1991 | Pacocz | 62/264 |
| 5,121,613 A | * | 6/1992 | Coix et al. | 62/515 |
| 5,755,103 A | * | 5/1998 | Na et al. | 62/264 |

* cited by examiner

*Primary Examiner*—Ronald Cappssela
(74) *Attorney, Agent, or Firm*—Anderson, Levine & Lintel, L.L.P

(57) ABSTRACT

An angled germicidal lamp is used to illuminate a coil and drain pan for optimum energy utilization. In one embodiment, a variable angled mount is used for positioning a germicidal lamp at a desired angle at the time of installation. In a second embodiment, a fixed angled mount is used for installation where the desired angle of mounting is known prior to installation. The angled germicidal lamp may be used with any coil installation, including flat, tilted and A-coils. For A-coil installations, a preformed delta plate is provided to ease installation.

13 Claims, 9 Drawing Sheets

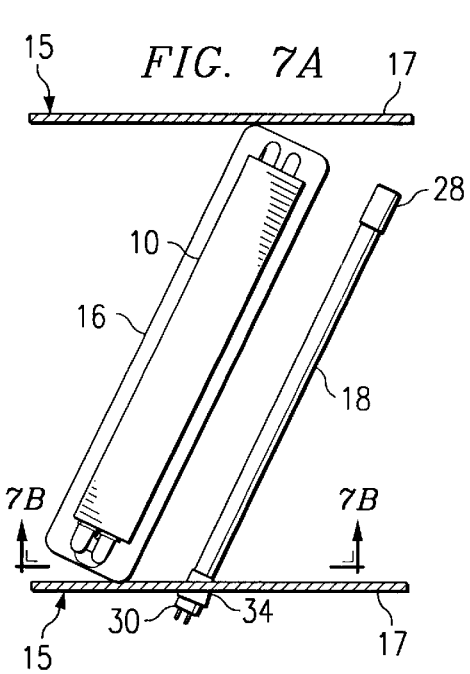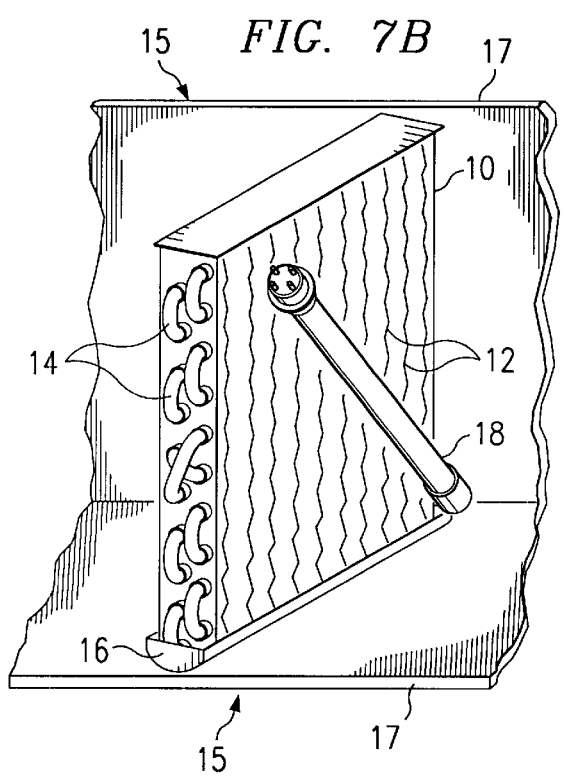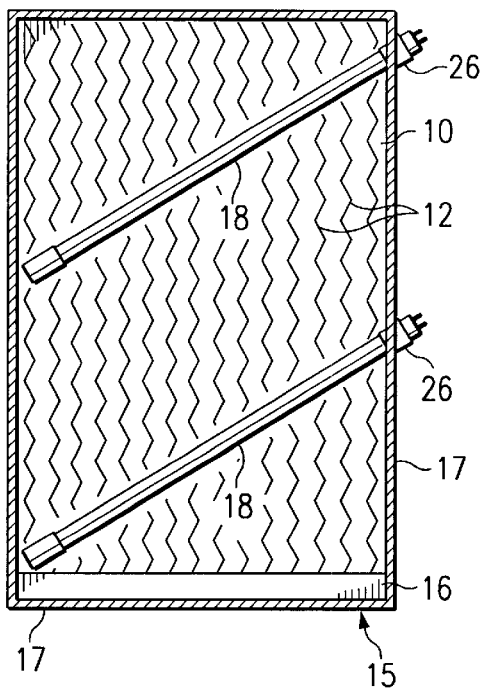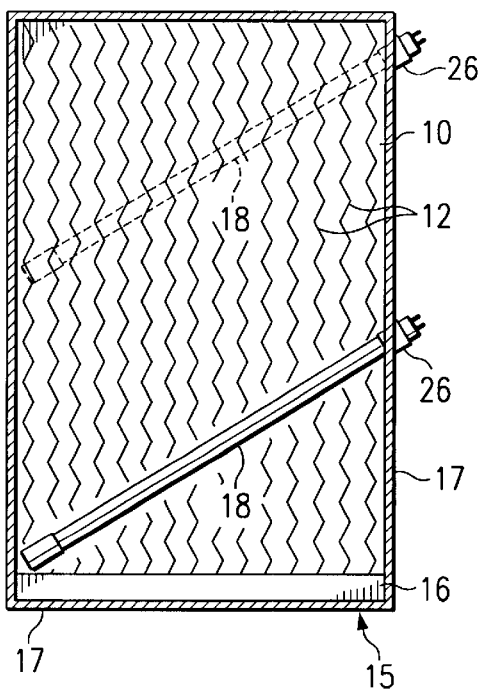

ANGLED UV FIXTURE IN A-COIL

CROSS-REFERENCE TO RELATED APPLICATIONS

This application is related to U.S. Ser. No. 10/026,167 to Burnett, entitled "Angled UV Fixture", filed concurrently herewith.

STATEMENT OF FEDERALLY SPONSORED RESEARCH OR DEVELOPMENT

Not Applicable.

BACKGROUND OF THE INVENTION

1. Technical Field

This invention relates in general to air conditioning systems and, more particularly, to an angled ultraviolet light fixture.

2. Description of the Related Art

Over the last several years, the use of ultraviolet (UV) light in commercial and residential air conditioning applications has become more popular. A UV light source in the UV-C spectrum, specifically at 253.7 nm, and potentially UV light in other frequencies such as 187 nm, has been shown to be extremely effective in destroying bacteria and fungi in air conditioning systems.

During operation of an air-conditioning system, water condenses on the heat exchanger (typically referred to as the condensing coil). The drain pan is situated below the coil and collects run-off from the coil. Because the cool and moist environmental conditions in the coil are conducive to microbial infestations, UV lamps are often used to illuminate the coil and drain pan. U.S. Pat. No. 5,817,276 to Fencl et al claims that the UV lamp should be oriented perpendicular to the fins of the coil for maximum reflection within the coil.

Mounting a substantially straight lamp perpendicular to the fins, however, has some significant shortcomings. First, in some orientations, the fins will be horizontal in relation to the drain pan. If a substantially linear UV lamp is mounted perpendicular to the drain pan, its effectiveness in killing bacteria in the drain pan may be reduced. Further, mounting a linear UV lamp perpendicular to the fins may result in the use of a relatively short UV lamp, which will not emit as much UV energy as would a longer lamp.

Therefore, a need has arisen for a method and apparatus for UV filtration that maximizes energy to the coil and drain pan for higher microbial efficacy.

BRIEF SUMMARY OF THE INVENTION

In the present invention, heat exchanger for use in an air conditioning system comprises first and second coil sides disposed at an angle to one another, and a plate coupled to the coil sides. The plate has a hole formed therethrough for accepting a germicidal lamp.

The heat exchanger of the present invention provides significant advantages. First, the configuration reduces the labor for installing a germicidal lamp. Second, a single heat exchanger can be produced to be compatible with installations with or without germicidal lamps.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIGS. 1b and 1c illustrates top and side cross-sectional views of FIG. 1a;

FIGS. 7a and 7b illustrate the angled germicidal lamp used in conjunction with a slanted coil;

FIGS. 7c and 7d illustrate front views of an embodiment with multiple angled germicidal lamp for severe angles;

DETAILED DESCRIPTION OF THE INVENTION

The present invention is best understood in relation to FIGS. 1–12 of the drawings, like numerals being used for like elements of the various drawings.

Figure 1A:
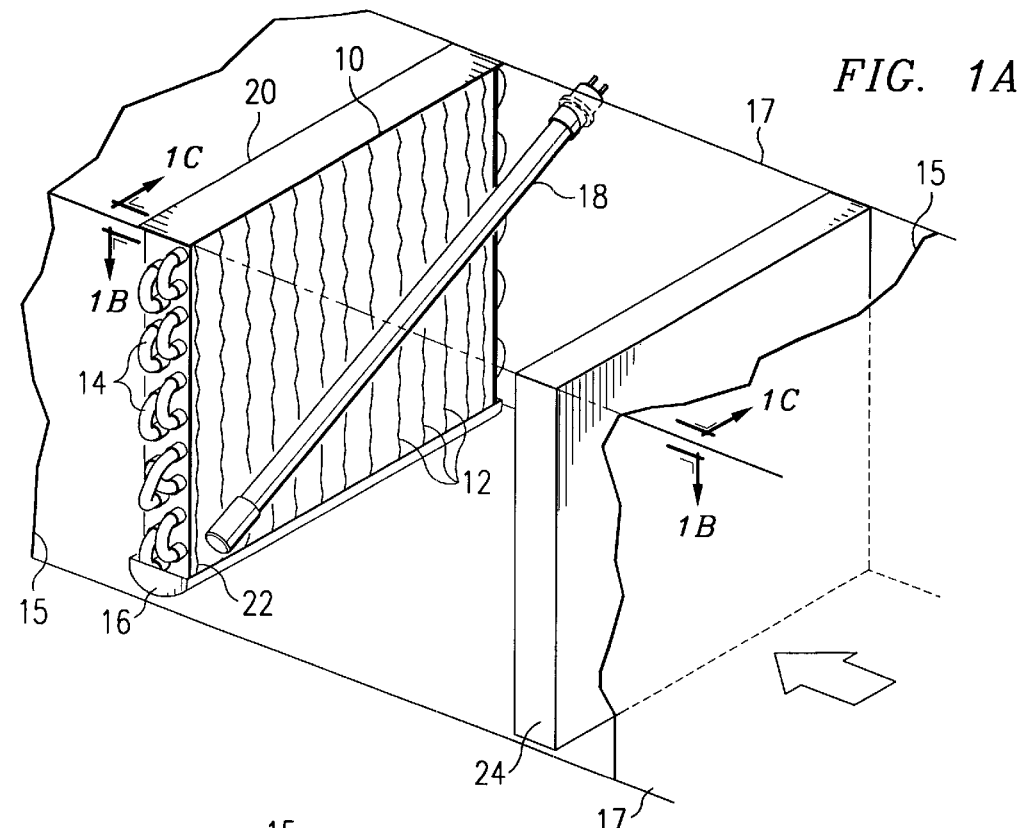
FIG. 1a illustrates a perspective view of a coil illuminated by a angled germicidal lamp.

FIG. 1a illustrates a generalized perspective view of the present invention. A coil 10 having fins 12 and coolant exchange tubes 14, is disposed in a duct 15 of an air conditioning system. A drain pan 16 is disposed below the coil, such that condensation from the coil 10 flows into the drain pan 16. A germicidal lamp 18 is disposed between a first position near an upper corner 20 of the coil 10 and a second position near opposite lower corner 22. Airflow is shown as passing through a filter 24, which typically precedes the coil 10 in the direction of the airflow. Generally, the airflow is produced by a blower motor (not shown). The blower motor is often placed between the coil 10 and filter 22, although it could also be placed before the filter or after the coil. The relative order of the blower motor, filter 24 and coil 22 is not critical for the operation of the present invention. Also, while the duct of FIG. 1a is shown in a horizontal configuration, it could be vertical or at any angle in other configurations. Further, the any type of germicidal lamp 18 could be disposed on either side of the coil, or on both sides. The lamp 18 could be, for example, a single-ended, dual-ended bi-pin, or mini-bi-pin or other configuration. In a dual-ended, configuration, an electrical connection to the far side could be made, for example, using a uni-strut-angle bracket with the terminal box and electrical connections.

In operation, the air in duct 15 is forced through the coil 10 by a blower motor. The fins 12 are cooled by the coolant exchange tubes 14; hence air passing over the fins is cooled as well. Cooling the air causes condensation to form on the tubes 14 and fins 12. Gravity causes the condensation to flow towards the drain pan 16. The cool moist conditions are ideal for the growth and reproduction of bacteria, mold and other microorganisms on the coil 10 and in the drain pan 16.

The germicidal lamp 18 shines on both the coil 10 and the drain pan 16. Typically, the germicidal lamp is a UV-C frequency lamp, which has been shown to be extremely effective in combating bacteria and mold and other airborne organisms. Other frequencies could also be used.

Placing the germicidal lamp 18 at an angle of 10 degrees to 80 degrees to a duct sidewall 17 preferably from a position near one corner of the coil 10 towards an opposite corner of the coil 10 (rather than orienting the lamp horizontally or vertically with respect to a sidewall 17 of duct 15) provides significant benefits. First, the angled disposition of the lamp 18 allows a longer lamp to be used. A longer lamp provides a greater energy output than a shorter lamp of the same intensity. Hence, more energy is available for destroying microorganisms. The increased energy is particularly evident in the drain pan 16.

Figure 1B:
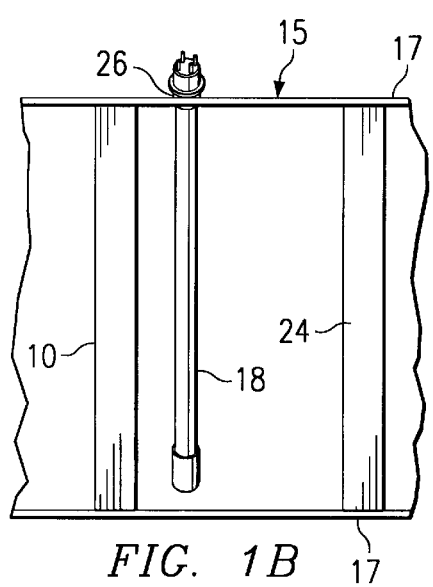
Figure 1C:
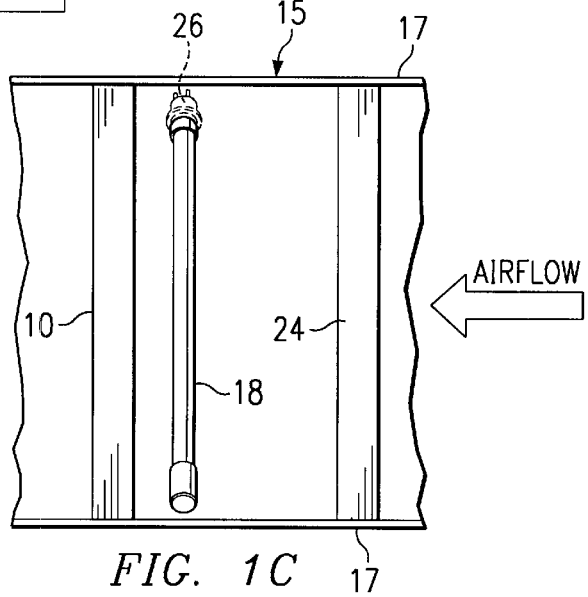

FIGS. 1b and 1c illustrate top and side views, respectively, of the air conditioning system of FIG. 1a. in FIG. 1b, an angled mount 26 as shown which allows the germicidal tube 18 to be mounted on a sidewall 17 of duct 15 at a desired angle. Embodiments for the angled mount 26 are shown in greater detail in connection with FIGS. 2–9.

Figure 2:
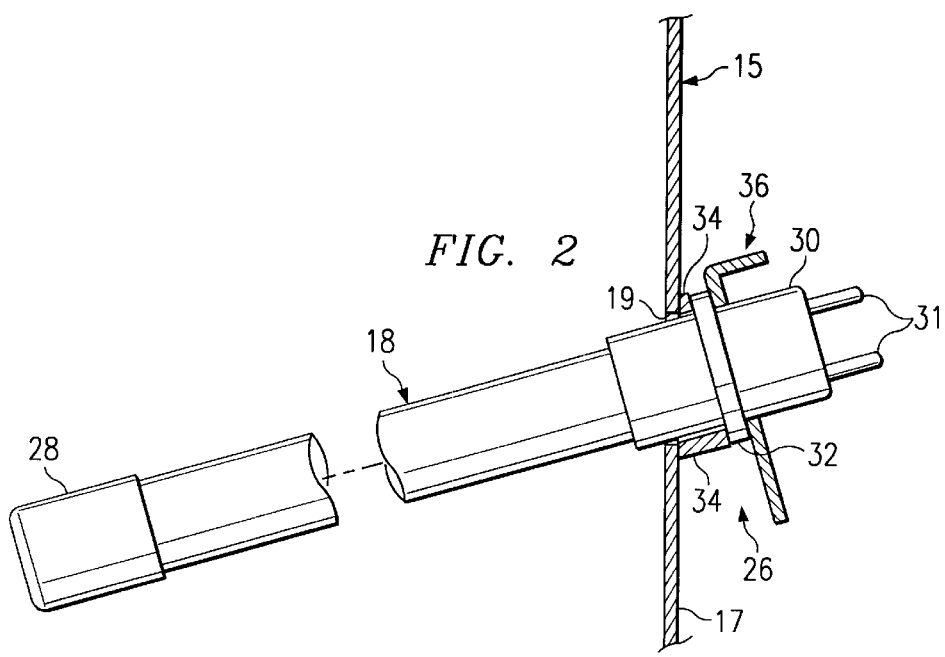
FIG. 2 illustrates a first embodiment of an angled mounting system.

FIG. 2 illustrates a partially cross-sectional view of a first embodiment of an angled germicidal lamp that allows for variable angle positioning. FIG. 2 illustrates a side view of a germicidal lamp 18 disposed through a hole 19 in duct 15 (shown in cross-section) at an angle set by angled mount 26. Germicidal lamp 18 is preferably a single-terminated lamp of double-terminated lamp with return wires such that all electrical connections are available at one end of the lamp. Lamp 18 includes an endcap 28 at the end of the lamp 18 within the duct 15 and an endcap 30 at the end of the lamp 18 outside of the duct 15. Endcap 30 includes a flange 32 which oriented in a plane perpendicular to the longitudinal axis of the lamp 18, or at another fixed angle. Electrical contacts 31 protrude endcap 30 these contacts are connected to the ballast.

Angled mount 26 includes angled coupler 34 (shown in cross-section) and restraining mechanism 36. Angled coupler 34 abuts a sidewall 17 of duct 15 and flange 32, thus holding the longitudinal axis of lamp 18 at a desired angle to the plane of the sidewall 17 of duct 15 and, consequently, to the coil 10, as shown in FIG. 1. Restraining mechanism 36 holds the flange 32 and angled coupler 34 fixedly against duct 15.

In typical installations, the coil 10 is accessible from the outside through a "cabinet" or "housing". For purposes of this specification, the cabinet of housing will be considered part of the duct 15. Further, electronics for powering the germicidal lamp 18, commonly referred to as a "ballast", are contained in a housing which is typically secured to the outside of the duct 15. It is possible, and sometimes most efficient, to attach the lamp 18 to the ballast housing; therefore, for purposes of the specification, the ballast housing or any other housing for containing the end of lamp 18, is considered to be part of the pertinent sidewall 17 of duct 15 as well.

Figure 3A:
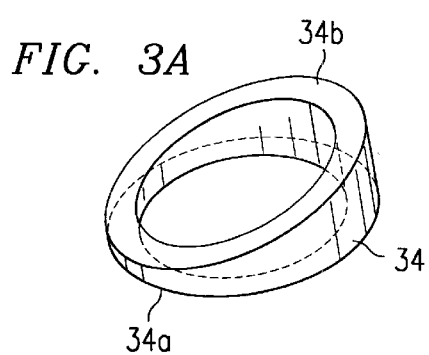
FIGS. 3a, 3b and 3c illustrate perspective, side and top views of an angled coupler used in the angled mounting system of FIG. 2.
Figure 3B:
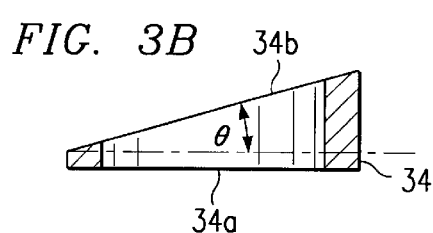
Figure 3C:
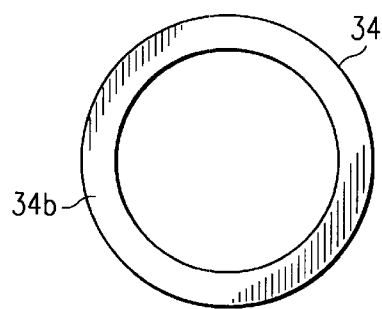

FIGS. 3a, 3b and 3c illustrate the angled coupler 34 in perspective view cross-sectional side view and top view, respectively. Angled coupler 34, as shown in FIGS. 3a–c, is tubular in shape, with a first end 34a cut in a plane perpendicular with the longitudinal axis of the tube and a second end 34b cut in a plane at an angle θ with respect to the first end (FIG. 3b).

The angled coupler 34 has an inner diameter that is sufficiently wide to clear endcap 28 (FIG. 2) for installing the coupler on the lamp 18, but is narrow enough to prevent flange 32 from passing through the coupler.

Figure 4A:
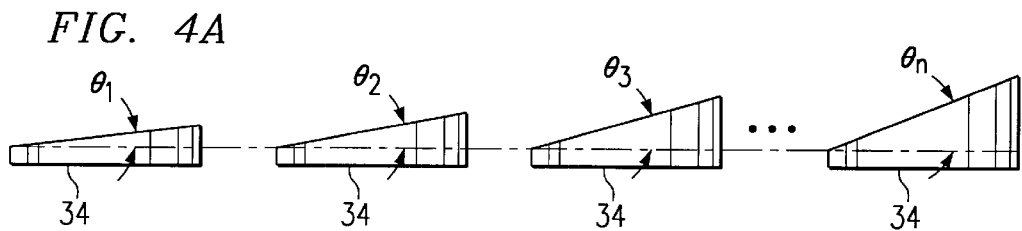
FIG. 4a illustrates a set of angled couplers having different angles.

As shown in FIG. 4a, a set of angled couplers 34 can be provided with different θ values, i.e., $\theta_1 < \theta_2 < \theta_3 < \theta_n$. An installer can chose a desired angle for the germicidal lamp by selecting an appropriate coupler 34 having the proper θ measurement.

Figure 4B:
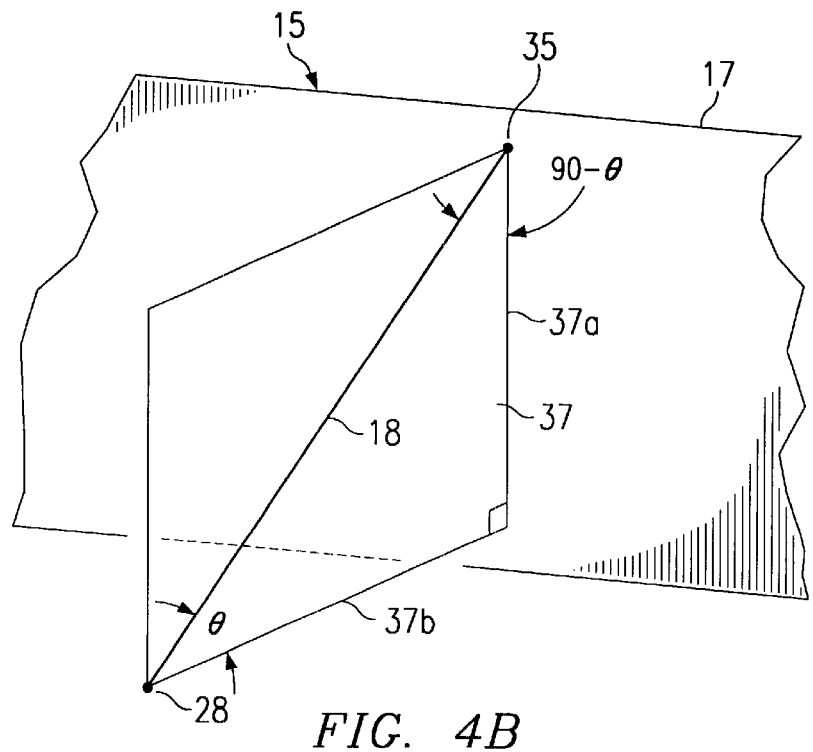
FIG. 4b illustrates the angle formed by a coupler.

FIG. 4b illustrates the angle created by the lamp 18 relative to a sidewall 17 of the duct. In FIG. 4b, the major axis of the lamp 18 is shown from a point of entry 35 through a sidewall 17 of the duct 15. For defining the angle of the lamp, the lamp 18 is shown in a rectangular plane 37, having side 37a common with the sidewall 17 of duct 14 at point of entry 35 and side 37b perpendicular to side 37a and intersecting the end 28 of lamp 18. For an angled coupler 34 with an angle θ, the major axis of lamp 18 makes angle of θ with side 37b. Consequently, the major axis of lamp 18 makes angle of 90-θ with side 37a.

Figure 4C:
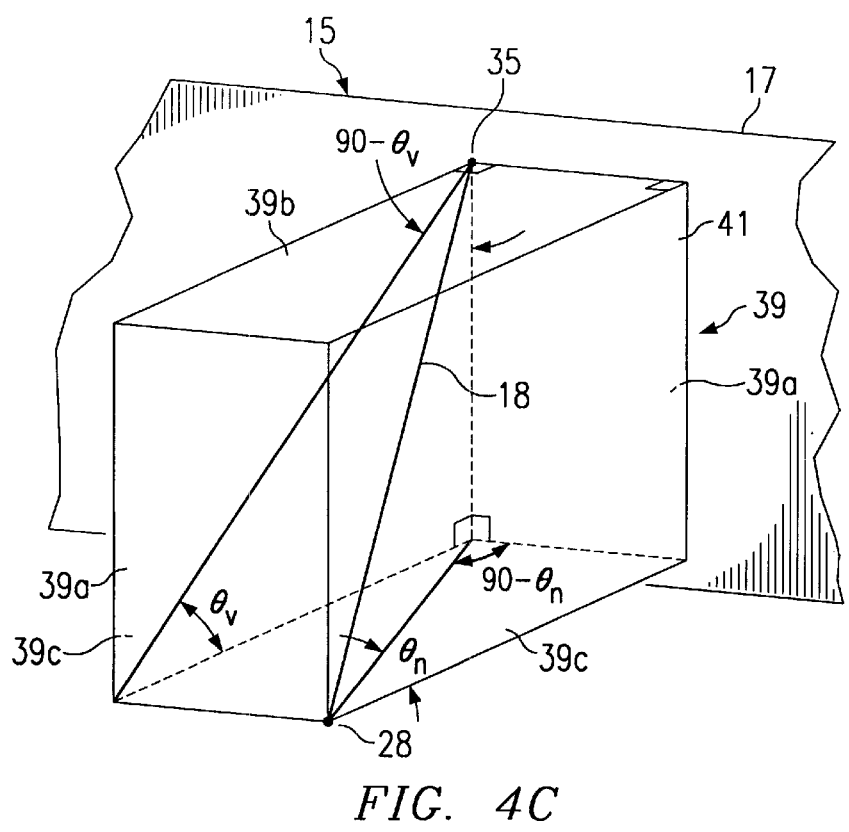
FIG. 4c illustrates a compound angle formed by a coupler.

If plane 37 is perpendicular to the sidewall 17 of duct 15, the angle θ is a simple plane. However, if plane 37 is not perpendicular to the sidewall 17 of duct 15, then the angle is a "compound" angle, having both vertical angle and horizontal angle components, as shown in FIG. 4c. In this case, the major axis of lamp 18 is shown in a box 39, having a common side 41 with the sidewall 17 of duct 15. Box 39 has front/back planes 39a, top/bottom planes 39b and side planes 39c. The vertical component $\theta_v$ of angle θ (from the end 28 of lamp 18) is shown as the image of the lamp 18 on a side plane 39c, measured relative to the bottom of side plane 39c. The horizontal component $\theta_h$ of angle θ is shown as the image of the lamp 18 on a top/bottom plane 39a, measured relative to the edge of side plane 39c that intersects the end 28 of lamp 18. The vertical and horizontal angle components relative the sidewall 17 of the duct 15 are 90-$\theta_v$ and 90-$\theta_h$, respectively.

Figure 5:
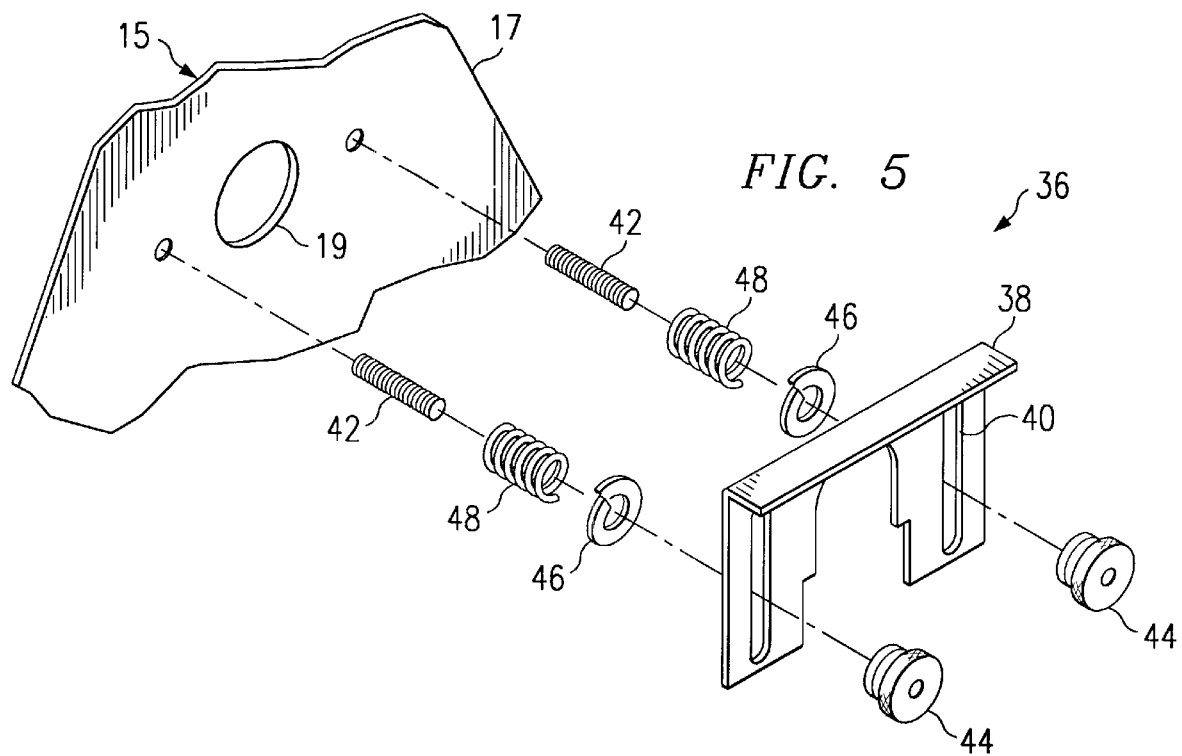
FIG. 5 illustrates an exploded view of a retainer mechanism.

FIG. 5 illustrates en exploded view of a restraining mechanism 36 that could be used in connection with lamp 18 and angled coupler 34 to hold the lamp 18 at the desired angle. Restraining mechanism 36 includes a slide clip 38 with dual slots 40. Threaded studs 42, which are attached to duct 15 are disposed through respective slots 40, such that slide clip 38 can travel up and down in relation to the studs 42 when the restraining mechanism is in an unlocked state. Nuts 44 are threaded to screw onto studs 42. On each stud 42, a locking washer 46 and a spring 48 are disposed about stud 42 on the opposite side of slide clip 38 from nuts 44.

Figure 6A:
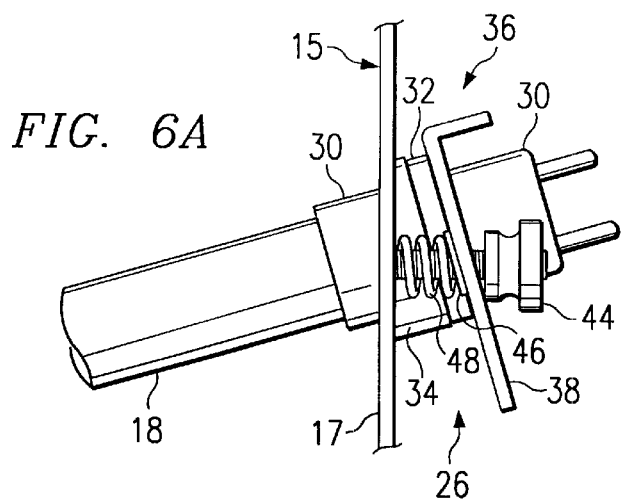
FIGS. 6a and 6b illustrate side and front views of the retainer mechanism of FIG. 5a in a locked position.
Figure 6B:
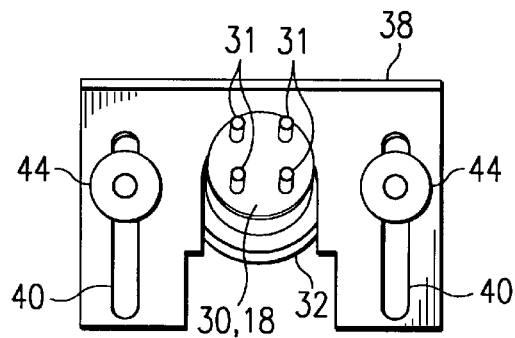

FIGS. 6a and 6b illustrate side and front views of the restraining mechanism 36 of FIG. 5 in a "locked" position with the nuts 44 tightened to firmly press flange 32 and angled coupler 34 against duct 15 (shown in cross-section in FIG. 6a). The slide clip 38 is placed such that the narrow portion of the opening is set against the endcap 30 with the clip 38 pressing against flange 32. In this position springs 48 press lock nuts 46 against the opposite side of slide clip 38 so that the slide clip is restrained by friction from sliding upwards to an unlocked position.

FIG. 6b illustrates a front view of the restraining mechanism in the locked position.

In operation, the angled germicidal lamp shown in FIGS. 1–6 can be used to accommodate a variety of coil configurations and sizes. To mount the germicidal lamp, the installer forms hole 19 in the duct 15 through which the lamp 18 will be installed. Typically, the hole would be located on the duct at a position near an upper corner of the coil 20. The studs 48 are secured to the duct 15 at the sides of the hole 19 (in general, it is beneficial to secure the studs to a plate or chassis to reinforce thinner duct material). A spring 48 and locking washer 46 are placed around each stud 48. Slide clip 38 is placed over the studs 48 and the nuts 44 are placed over the studs 48. An angled coupler 34 is chosen such that the lamp 18 is directed to the opposite corner of the coil 20, as shown in FIG. 1. The selected angled coupler 34 is placed around the lamp 18 and positioned against flange 32 at the opposite end of the lamp 18. The lamp 18 is placed through the hole 19 such that the angled coupler 34 is flush against duct 15 and flange 372 is flush against the angled coupler 34. The slide clip is placed in a locked position against the flange and the nuts 44 are tightened.

In general, the lamp is oriented between two opposite corners, as shown in FIG. 1. The germicidal lamp 18, however, should be angled such that the end of the lamp does not protrude lower than the plane of the top of the drain pan 16. Also, in order to enter at a flat portion of the duct 15, the lamp may be positioned somewhat below the upper corner of the coil 10. Typically, the angle of the longitudinal axis of the lamp will be between 10 and 80 degrees relative to the horizontal plane at the top of the coil 10 or at the edge of the drain pan 16, depending upon the application and the relationship between coil depth, width, height and angle of tilt in the air handling unit. The lamp 18 could enter the duct at a corner as well, although the mounting may be more difficult.

FIGS. 7a and 7b illustrate top and side views, respectively, of an embodiment where the coil 10 is placed in at a non-perpendicular angle to the major axis of the duct 15, as opposed to FIG. 1, where the coil is disposed perpendicular to all four sidewalls 17 of duct 15. In this case, the angled coupler 34 provides a mount to orient the lamp 18 such that the longitudinal axis of the lamp 18 runs parallel to the plane of the coil, between opposite corners. In this case, the coupler 26 sets the lamp at a compound angle relative to a sidewall 17 with a non-zero $\theta_h$ and $\theta_v$. While FIGS. 7a and 7b illustrate a coil tilted about a vertical axis, the coil could be tilted about a horizontal axis as well. In this case, the lamp 18 could be disposed in a simple angle (in a plane normal to the major axis of the duct 15) or a compound angle (in a plane parallel to the coil 10) as shown in conjunction with FIGS. 12a and 12b (or an A-coil).

FIG. 7c illustrates an embodiment where multiple angled lamps are used to in a situation where there is a severe angle. This embodiment provides better coverage for the coil 10. While the lamps are shown as one on top of the other for a coil with large vertical aspect ratio; they could also be mounted side by side from the top of the duct for a coil 10 with a large horizontal aspect ratio. Also, the lamps could be mounted on opposite sides of the coil, as shown in FIG. 7d, in order to increase the amount of energy from the upper limit 18 to the drain pan 16.

Figure 8:
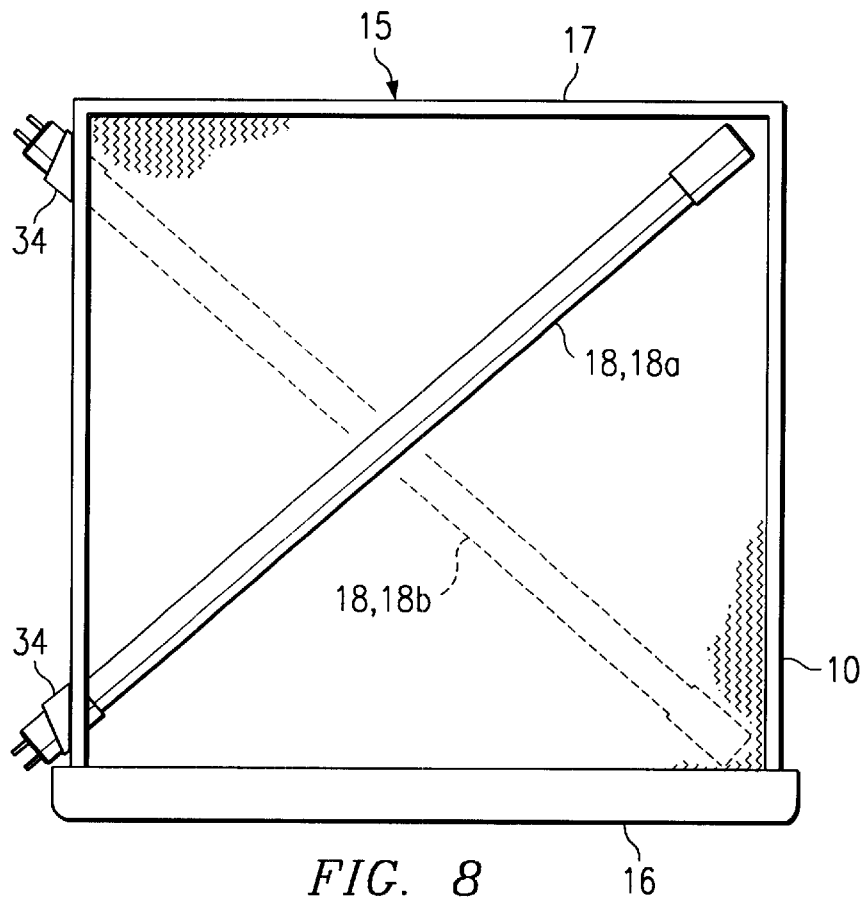
FIG. 8 illustrates a dual angled germicidal lamp configuration.

FIG. 8 illustrates front view of an embodiment of the invention where two lamps 18 are used on opposite sides of the coil 10. In this embodiment, a first lamp 18a is disposed from the lower left corner to the upper right corner on a first side of the coil, while a second lamp 18b is disposed from the upper left corner to the lower right corner on the second side of the coil 10.

This embodiment provides several advantages. First, each quadrant of the coil receives an essentially similar energy close. Second, the energy dose to the drain pan 16 is increased along its major axis. While the illustrated embodiment shows the lamps 18 on opposite sides of the coil 10, both lamps 18 could be placed on the same side of the coil.

Figure 9:
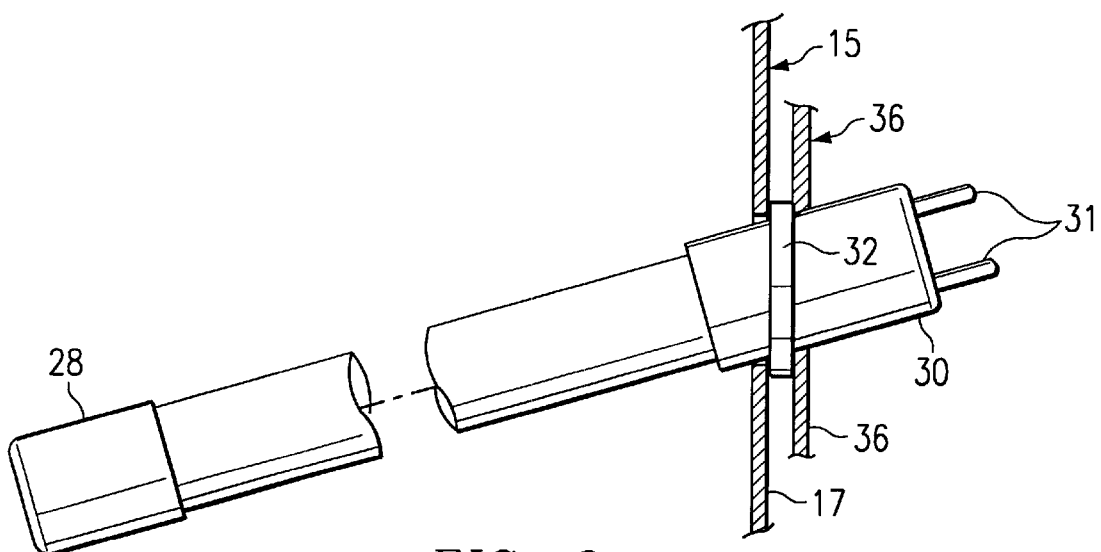
FIG. 9 illustrates a fixed angle germicidal lamp using an angled flange.

FIG. 9 illustrates an alternative embodiment, where the flange 32 provides the angle set by the angled coupler 34 of FIGS. 2–6. In an embodiment where the angle of the flange 32 is not adjustable, the lamp can be cost-effective in situations where the desired angle is known in advance. In particular, the angled flange 32 of FIG. 9 could be used on a germicidal lamp 18 specified for a particular coil model. In another embodiment, the angle of the flange 32 relative to the longitudinal axis of the germicidal tube 18 could be adjustable, for example by pivot points on opposite sides of the flange, to accommodate multiple angles.

Figure 10A:
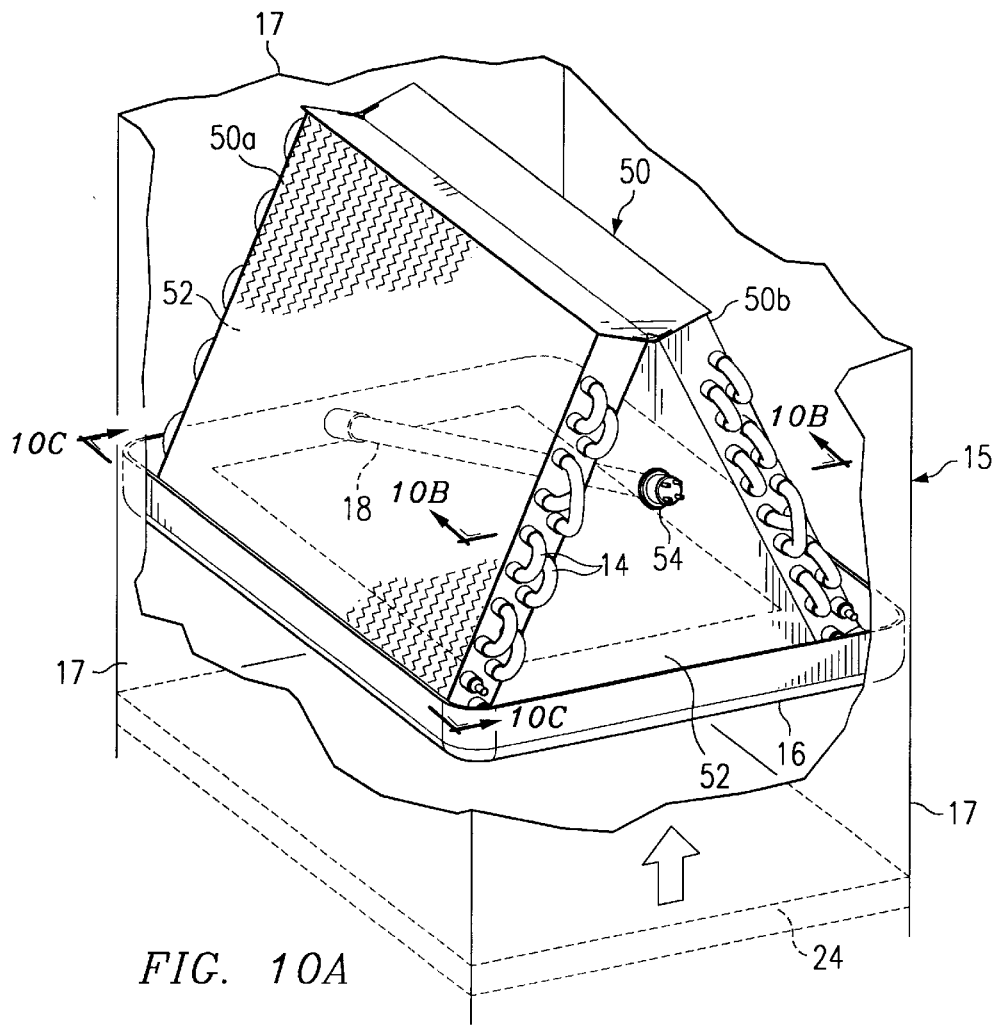
FIGS. 10a through 10c illustrate an angled germicidal lamp used to illuminate the interior of an A-coil.
Figure 10B:
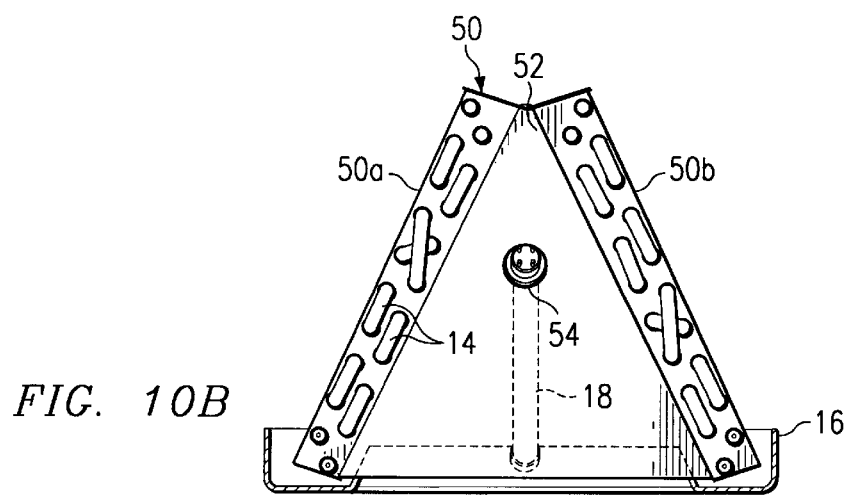
Figure 10C:
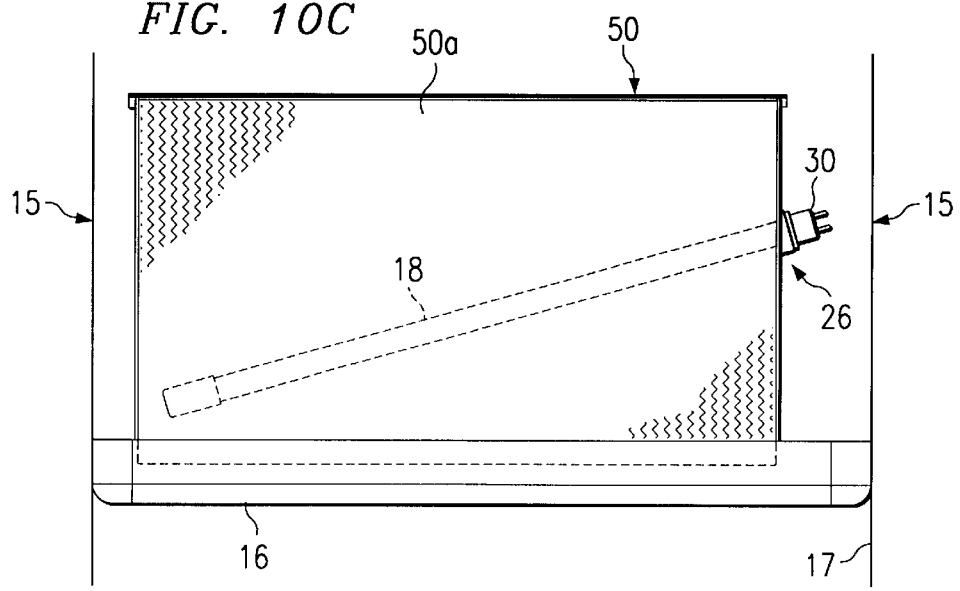

FIG. 10a illustrates a perspective view of the present invention used with an A-coil 50. FIGS. 10b and 10c illustrate front and side views of the device of FIG. 10a. A coil 50 has two coil sides 50a and 50b, which are connected at an angle. A triangular delta plate 52 is connected to the openings on either side of the coils 50a–b to create a tent-like enclosure with an open bottom. The drain pan 16 runs about the perimeter of the A-coil 50 such that an opening is formed at the bottom through which air can flow. In FIGS. 10a–c, the lamp 18 is placed through a hole 54 in the delta plate 52 located towards the peak of the A-coil 50 and is directed towards the bottom of the opposite delta plate 52. Similarly, the hole 54 could be located at the bottom of the delta plate 52 and the lamp 18 could be angled towards the peak of the A-coil on the opposite side.

As with the embodiment of FIG. 1, the lamp 18 is directed between opposite corners of the coils 50a and 50b. Also, the angle of the lamp could be provided by the angle coupler 34 or an angled flange 32.

Figure 11A:
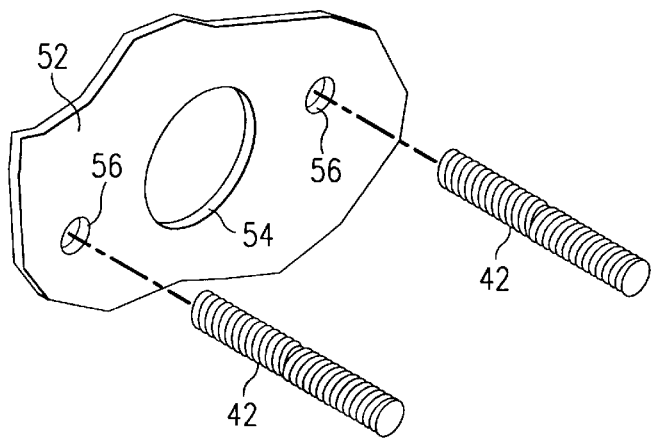
FIGS. 11a and 11b illustrate a delta plate used in an A-coil that is modified to be germicidal lamp ready.
Figure 11B:
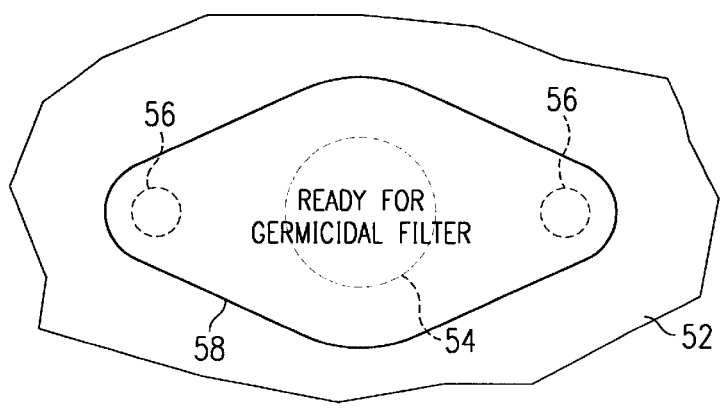

FIGS. 11a–b illustrate an embodiment for the A-coil for efficient installation of the germicidal lamp. In this embodiment, the hole 54 is preformed in one of the delta plates 52, as are tapped holes 56 for the studs 42. Knurl-nuts, which have threads in one orientation for installation into holes 56 and threads in the opposite orientation for receiving the nuts 44, can be used for the studs 42.

As shown in FIG. 11b, an overlay 58 is secured to the delta plate 52 prior to installation. If a germicidal lamp is to be used, the overlay 58 is removed; otherwise it is left on the delta plate 52. The overlay 58, for example, may be a sticker that is adhered to the delta plate 52 or it may be a plate that is screwed into holes 56.

In operation, the lamp 18, if a germicidal lamp is used, a hole is cut in the duct 15 to access the delta plate 52. The studs 42 are secured to the holes 56 and the lamp 18 is attached to the delta plate 52 through the hole 54 as described in above. The electrical connections pass-through the duct 15 to the ballast.

The delta plate shown in FIGS. 11a and 11b provides significant advantages. First, the configuration reduces the labor for installing a germicidal lamp. Second, the coil is compatible with installation with or without germicidal lamps.

Figure 12A:
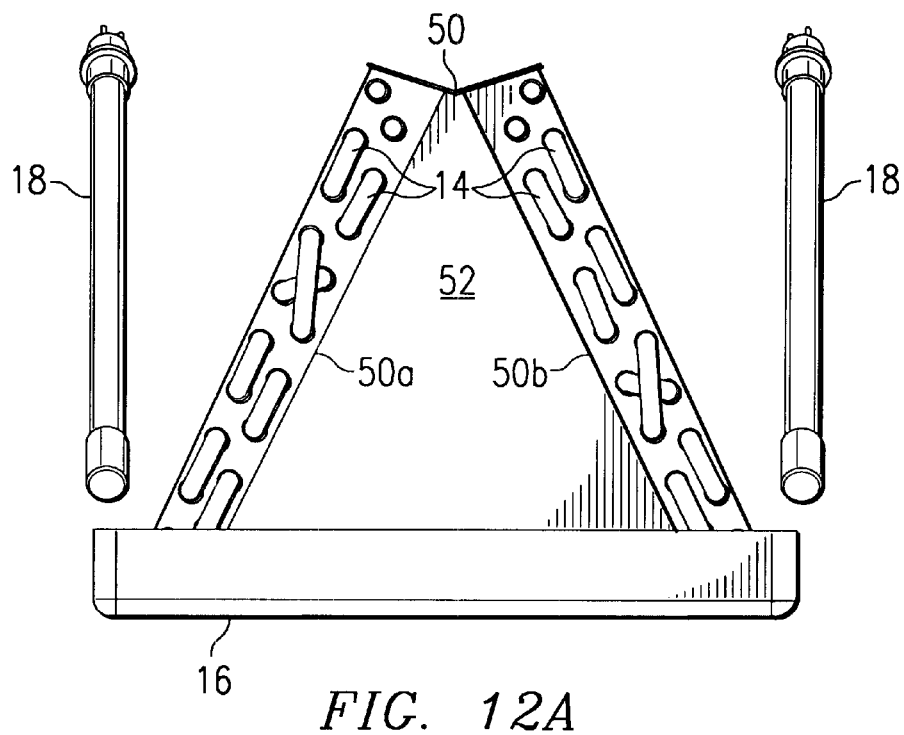
FIGS. 12a and 12b illustrate angled germicidal lamps used to illuminate the exterior of an A-coil.
Figure 12B:
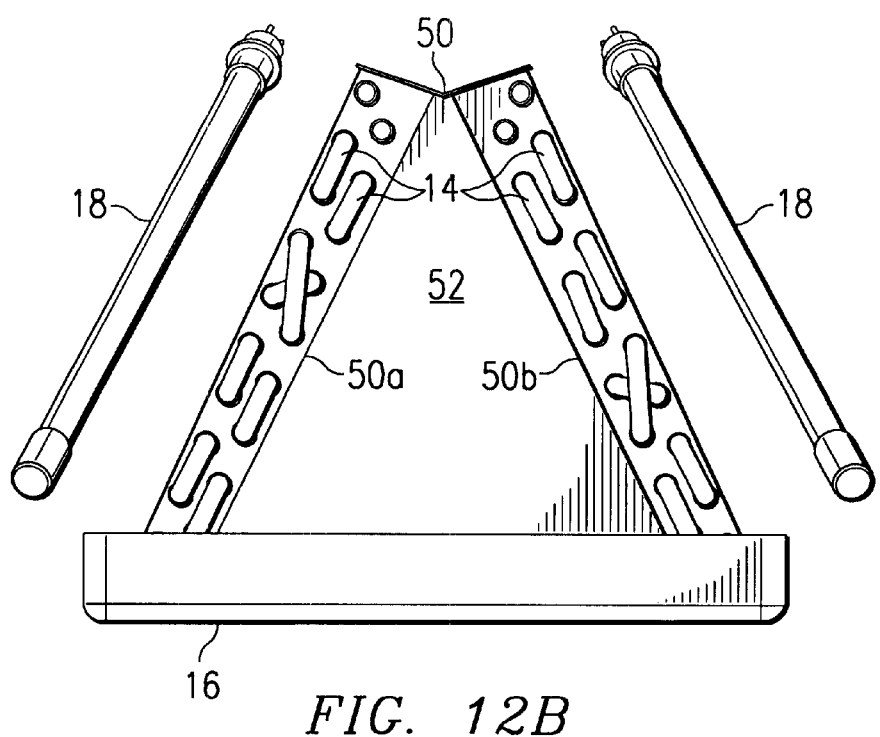

FIGS. 12a and 12b illustrate an alternative embodiment for an A-coil, where lamps 18 are positioned outside of the A-coil 50, such that one lamp 18 illuminates coil 50a and the other lamp 18 illustrates coil 50b. In FIG. 12a, the lamps are angled such that the longitudinal axis is above respective segments of drain pan 16 and one end of the lamp 18 is further away from the coil 50 than the other end. In this case, the lamp 18 is disposed within a vertically-oriented plane and, preferably, angled between diagonally opposed corners of the coil 50a or 50b, as projected into the plane.

In FIG. 12b, on the other hand, the lamps 18 are angled to be equidistant from the respective coil 50a or 50b along the length of their longitudinal axis. In other words, the lamp is disposed in a plane that lies parallel to the associated coil 50a or 50b. The embodiment of FIG. 12a places more light on the drain pan 16, while the embodiment of 12b provides a more uniform illumination for the coils 50a and 50b.

In either configuration, each lamp 18 is angled from one corner to an opposite corner as shown in FIG. 1. The angled mount for the lamp 18 could be a variable angled mount or a fixed angled flange. Further, the exterior angled germicidal lamps could be used in conjunction with the interior germicidal lamps shown in FIGS. 10a–c.

Although the Detailed Description of the invention has been directed to certain exemplary embodiments, various modifications of these embodiments, as well as alternative embodiments, will be suggested to those skilled in the art. The invention encompassed any modifications or alternative embodiments that fall within the scope of the claims.

What is claimed is:

1. A heat exchanger for use in an air conditioning system, comprising:
    first and second coil sides disposed at an acute angle to one another; and
    a plate coupled to said coil sides, said plate having a hole formed therethrough in a portion of the plate within the interior of the acute angle for accepting a germicidal lamp for illuminating the first and second coil sides.

2. The heat exchanger of claim 1 wherein said plate further includes a hole covering for covering said hole when not used to accept a germicidal lamp.

3. The heat exchanger of claim 2 wherein said hole covering comprises an adhesive backed material.

4. The heat exchanger of claim 1 wherein said plate further includes threaded holes for receiving a threaded attachment member.

5. An air conditioning system comprising:
    a duct;
    a heat exchanger disposed in said duct, said heat exchanger comprising:
        first and second coil sides disposed at an angle to one another; and
        a plate coupled to said coil sides, said plate having a hole formed therethrough; and
    a germicidal lamp disposed through said hole.

6. The air conditioning system of claim 5 and further comprising a drain pan disposed under said heat exchanger to receive condensate formed on said coil sides.

7. The air conditioning system of claim 5 wherein said coil sides comprise coil slabs, said slabs coupled at an upper edge to define an A-coil.

8. The air conditioning system of claim 5 wherein said germicidal lamp is disposed through said hole at an angle between 10 and 80 degrees relative to said plate.

9. The air conditioning system of claim 8 wherein said hole is placed proximate a vertex of said angle formed by said first and second coil sides.

10. The air conditioning system of claim 5 wherein said germicidal lamp is mounted to said plate between the coil sides.

11. A method of controlling microorganisms in an air conditioning unit in a duct, comprising the steps of:
    positioning a heat exchanger in said duct, said heat exchanger including first and second coil sides disposed at an angle to one another and a plate coupled to said coil sides, said plate having a hole formed therethrough; and
    installing a germicidal lamp through said hole.

12. The method of claim 11 and further comprising the step of installing a drain pan beneath said heat exchanger.

13. The method of claim 11 wherein said installing step comprises the step of installing a substantially linear germicidal lamp such that the longitudinal axis of the germicidal lamp is at an angle between 10 and 80 degrees with said plate.

* * * * *